(12) United States Patent
Tanaka et al.

(10) Patent No.: US 12,505,235 B2
(45) Date of Patent: Dec. 23, 2025

(54) PROCESSING SYSTEM, PROCESSING METHOD, AND PROCESSING PROGRAM

(71) Applicant: NTT Communications Corporation, Tokyo (JP)

(72) Inventors: Satoshi Tanaka, Tokyo (JP); Yoichi Sakurai, Tokyo (JP); Masashi Sawada, Tokyo (JP)

(73) Assignee: NTT COMMUNICATIONS CORPORATION, Tokyo (JP)

( * ) Notice: Subject to any disclaimer, the term of this patent is extended or adjusted under 35 U.S.C. 154(b) by 161 days.

(21) Appl. No.: 18/372,161

(22) Filed: Sep. 25, 2023

(65) Prior Publication Data

US 2024/0012916 A1    Jan. 11, 2024

Related U.S. Application Data

(63) Continuation of application No. PCT/JP2022/014566, filed on Mar. 25, 2022.

(30) Foreign Application Priority Data

Mar. 26, 2021    (JP) .................................. 2021-053163

(51) Int. Cl.
*G06F 21/60* (2013.01)
(52) U.S. Cl.
CPC .................................. *G06F 21/604* (2013.01)
(58) Field of Classification Search
CPC ..... G06F 21/604; G06F 21/6254; G06F 21/62
See application file for complete search history.

(56) References Cited

U.S. PATENT DOCUMENTS

| | | | |
|---|---|---|---|
| 11,537,726 B2 | 12/2022 | Tanaka et al. | |
| 2013/0239226 A1* | 9/2013 | Miyakawa | G06Q 10/103 726/26 |
| 2020/0327252 A1 | 10/2020 | Mcfall et al. | |
| 2020/0410135 A1* | 12/2020 | Macey | G06F 18/23213 |
| 2021/0250177 A1* | 8/2021 | Yoo | G16Y 40/50 |
| 2021/0342476 A1 | 11/2021 | Tanaka et al. | |
| 2023/0359770 A1 | 11/2023 | Mcfall et al. | |

FOREIGN PATENT DOCUMENTS

| | | |
|---|---|---|
| EP | 3 449 414 A1 | 3/2019 |
| JP | 2013-156720 A | 8/2013 |
| JP | 2020-042128 A | 3/2020 |

(Continued)

OTHER PUBLICATIONS

Extended European Search Report issued May 14, 2024 in European Patent Application No. 22775842.2, 6 pages.

(Continued)

*Primary Examiner* — Thaddeus J Plecha
(74) *Attorney, Agent, or Firm* — XSENSUS LLP (57) ABSTRACT

A processing system distributes registration data that a registrar device has to a plurality of servers in a state of being segmented shares, and stores the registration data in the servers. Each of the servers includes first processing circuitry configured to perform anonymization on the shares, and provide anonymization-processed information on which anonymization is performed in the state of being shares.

6 Claims, 10 Drawing Sheets

(56) References Cited

FOREIGN PATENT DOCUMENTS

| WO | 2013/121738 A1 | 8/2013 |
|---|---|---|
| WO | 2019/124260 A1 | 6/2019 |

OTHER PUBLICATIONS

NTT Secure Platform laboratories, "System and Principles of Secure Computation", Available Online at: https://www.rd.ntt/sc/project/data-security/NTT-himitsu-keisan.pdf, Aug. 2018, pp. 1-34 (68 pages including English Translation).

Kiribuchi et al., "MEVAL3: A Library for Programmable Secure Computation", Cryptography and Information Security, The Institute of Electronics, Information and Communication Engineers, SCIS, Jan. 23-26, 2018, pp. 1-8 (12 pages including English Translation).

Kimura et al., "Evaluation of Secure Computation in a Distributed Healthcare Setting", Medical Informatics Europe (MIE), Available Online at: http://hdl.handle.net/2433/245590, 2016, pp. 152-156.

Chida et al., "Implementation and evaluation of an efficient secure computation system using 'R' for healthcare statistic" J Am Med Inform Assoc., vol. 21, Apr. 24, 2014, pp. e326-e331.

Karashi et al., "A Hybrid Anonymization with Secure Computation and Randomization", Proceedings of 2012 Symposium on Cryptography and Information Security [CD-ROM], SCIS, Jan. 30-Feb. 2, 2012, pp. 1-8 (10 pages including English Translation).

\* cited by examiner

PROCESSING SYSTEM, PROCESSING METHOD, AND PROCESSING PROGRAM

CROSS-REFERENCE TO RELATED APPLICATIONS

This application is a continuation application of International Application No. PCT/JP2022/014566, filed on Mar. 25, 2022 which claims the benefit of priority of the prior Japanese Patent Application No. 2021-053163, filed on Mar. 26, 2021, the entire contents of each are incorporated herein by reference.

FIELD

The present invention relates to a processing system, a processing method, and a processing program.

BACKGROUND

Business operators that deal with important information, such as medical information, are requested not only to take security measurement in compliance with legal restrictions and specific field guidelines but also to use and utilize information safely. Particularly, storing interdisciplinary data and using and utilizing data are expected to promote innovation and lead to development of various fields, such as economic growth, and at the same time are causes of inhibition of promotion of use and utilization of data in terms of risks associated with disclosure of data and protection of business strategies, and the like.

Thus, secure computing has been proposed as a technique that enables realization of these contradicting requests. Secure computing is a technique of keeping sensitive information confidential and sending only the result back without mutual disclosure.

Patent Literature 1: International Publication Pamphlet No. WO 2019/124260
Patent Literature 2: Japanese Laid-open Patent Publication No. 2020-042128
Non-Patent Literature 1: The Nippon Telegraph and Telephone Corporation, System and Principle of Secure Computing, [online], [searched on March 5th, Reiwa 3], the Internet <URL: .rd.ntt/sc/project/data-security/NTT-himitsu-keisan.pdf>
Non-Patent Literature 2: Naoto Kiribuchi, Hiroshi Igarashi, Hiroki Hamada, Ryo Kikuchi, "Programmable Secure Computing Library MEVAL3", Code and Information Security Symposium (SCIS), 2018.
Non-Patent Literature 3: Eizen Kimura, Koki Hamada, Ryo Kikuchi, Koji Chida, Kazuya Okamoto, Shirou Manabe, Tomohiro Kuroda, Yasushi Matsumura, Toshihiro Takeda, and Naoki Mihara, "Evaluation of Secure Computation in a Distributed Healthcare Setting", Medical Informatics Europe (MIE) 2016: 152-156.
Non-Patent Literature 4: Koji Chida, Gembu Morohashi, Hitoshi Fuji, Fumihiko Magata, Akiko Fujimura, Koki Hamada, Dai Ikarashi, Ryuichi Yamamoto, "Implementation and evaluation of an efficient secure computation system using 'R' for healthcare statistics", J Am Med Inform Assoc. 21, pp. 326-331, 2014.

In secure computing, data is kept confidential by secret sharing and, under existing laws, secret sharing is one type of coding and deals with personal information. For this reason, when a third party tries to realize cross-sectional analysis in which data is linked between organizations by secure computing, the third party is exposed to the data when analyzing the data although the data is in a form of a code and provision of personal information to a third-party occurs. Secure computing thus has a problem in that gaining consent for provision of personal information to a third party is inevitable.

The present invention was made in view of the above-described circumstances and an object of the present invention is to provide a processing system, a processing method, and a processing program that enable nonnecessity for gaining consent for provision of personal information to a third party when data in secure computing is used.

SUMMARY

It is an object of the present invention to at least partially solve the problems in the related technology.

According to an aspect of the embodiments, a processing system distributes registration data that a registrar device has to a plurality of servers in a state of being segmented shares, and stores the registration data in the servers, each of the servers including: first processing circuitry configured to: perform anonymization on the shares; and provide anonymization-processed information on which anonymization is performed in the state of being shares.

The above and other objects, features, advantages and technical and industrial significance of this invention will be better understood by reading the following detailed description of presently preferred embodiments of the invention, when considered in connection with the accompanying drawings.

DESCRIPTION OF EMBODIMENTS

An embodiment of a processing system, a processing method, and a processing program according to the present application will be described in detail below based on the drawings. Note that the embodiment does not limit the processing system, the processing method, and the processing program according to the present application.

In the following embodiment, flows of processes of the processing system, the processing method, and the processing program according to the present application will be described in order and effects of the embodiment will be described at the end.

EMBODIMENT

First of all, the embodiment will be described. In the embodiment, in secure computing in which computation can be performed with data being kept coded, by performing anonymization on original data in secure computing, anonymization-processed information by which no individual is specified is provided to a third party. Accordingly, in the embodiment, it is unnecessary to gain consent for provision of personal information to the third party when data is used in secure computing.

Overview of Configuration of and Processes in Processing System

Figure 1:
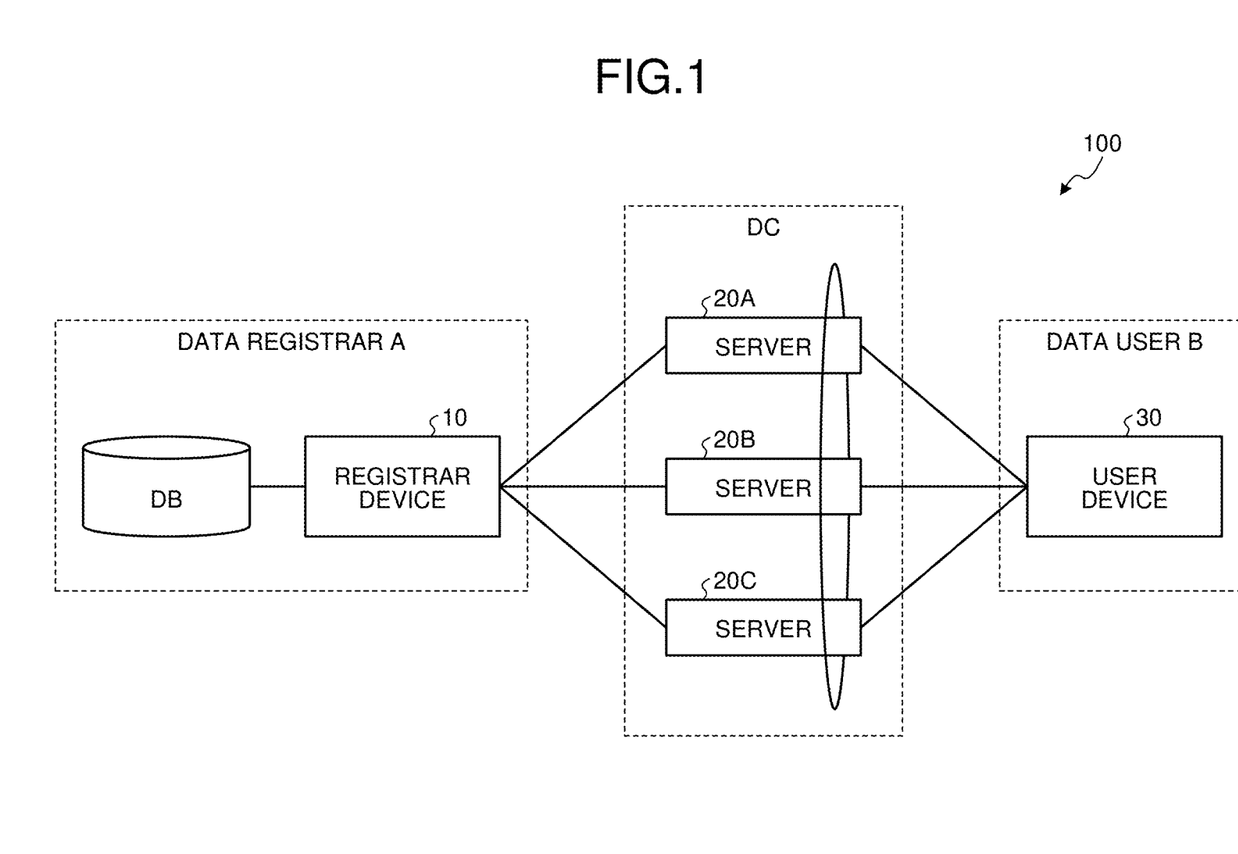
FIG. 1 is a block diagram illustrating an example of a configuration of a processing system according to an embodiment.
Figure 2:
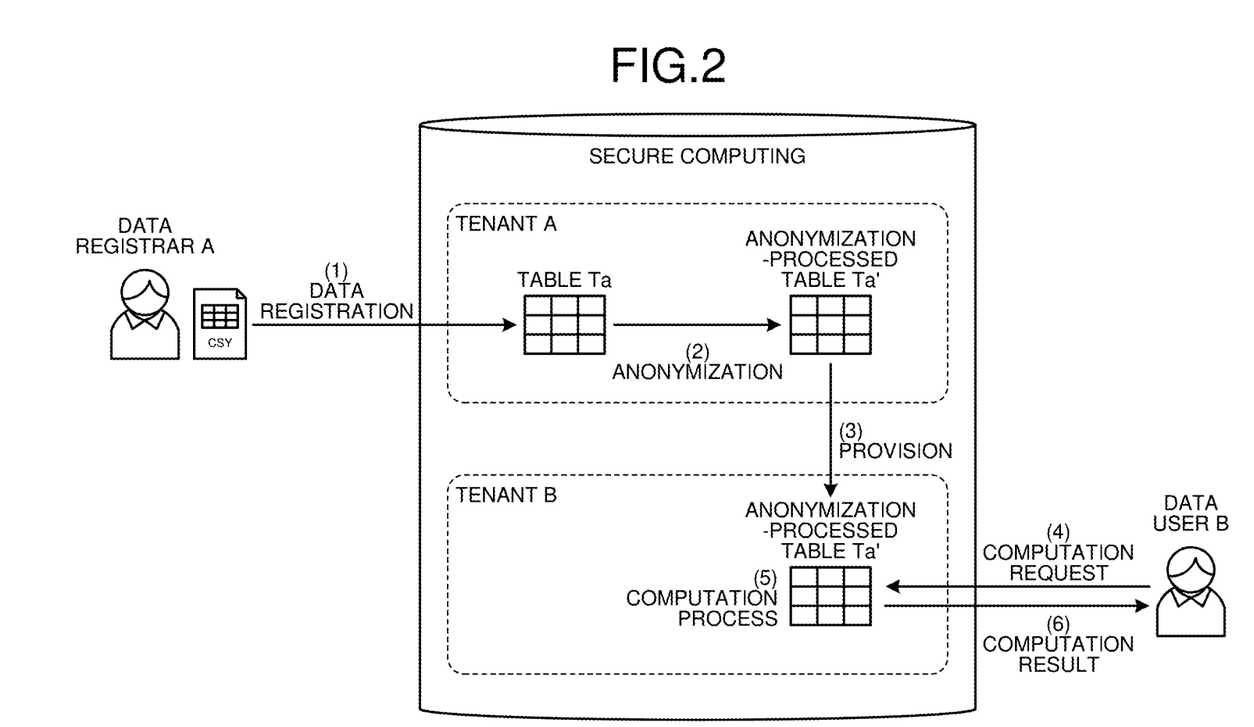
FIG. 2 is a diagram illustrating an overview of a process by the processing system according to the embodiment.
Figure 3:
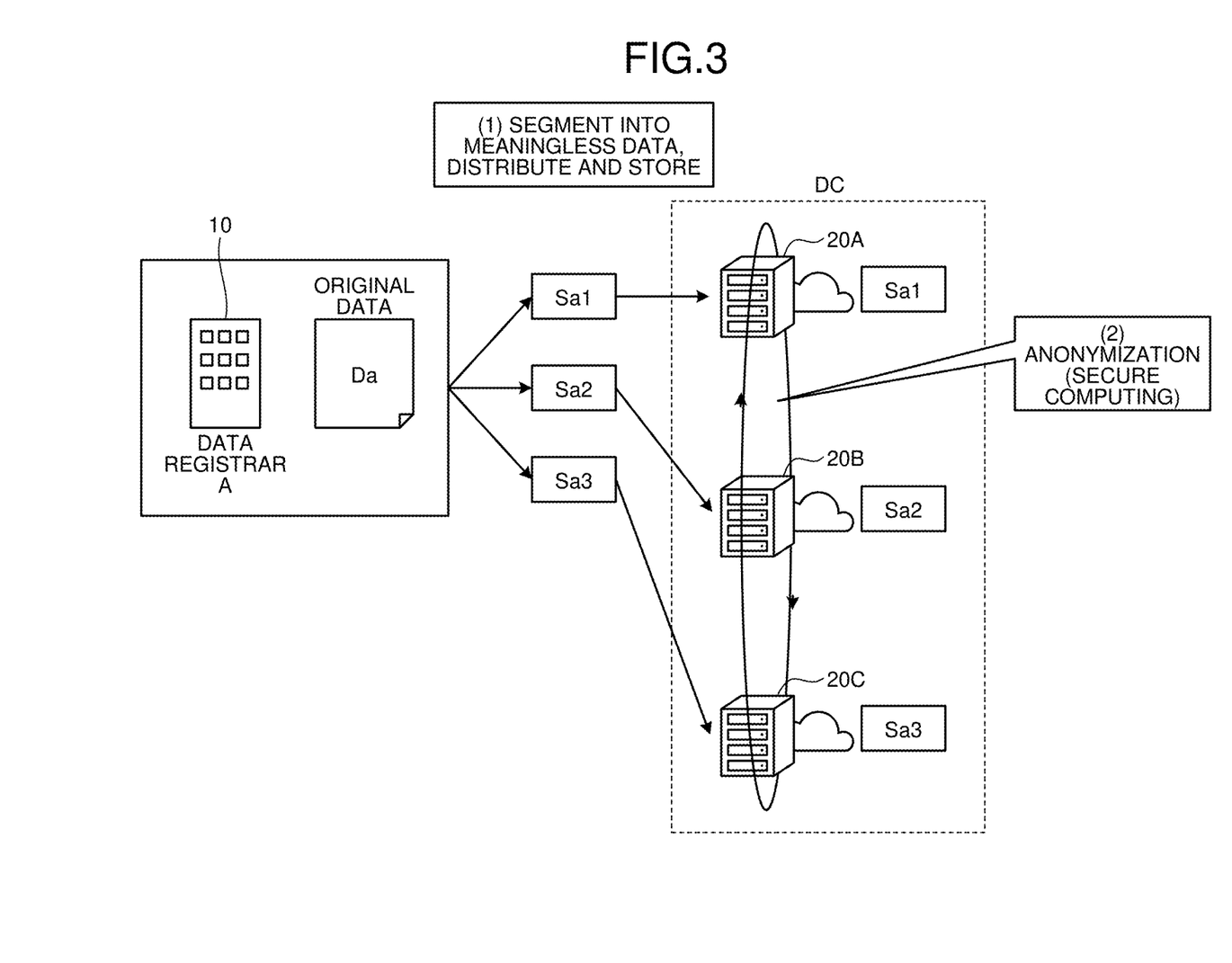
FIG. 3 is a diagram illustrating an overview of a process by the processing system according to the embodiment.

A configuration of the processing system and an overview of processes in the processing system according to the embodiment will be described. FIG. 1 is a block diagram illustrating an example of the configuration of the processing system according to the embodiment. FIG. 2 and FIG. 3 are diagrams illustrating the overview of the processes in the processing system according to the embodiment.

A processing system 100 according to the embodiment is a system that executes secure computing in which computation can be performed with data being kept coded. In the processing system 100, data is divided into a plurality of segments referred to as shares and, in the state where the shares are distributed to and stored in the servers, the servers perform multi-party computation in which computation and exchange of data are performed between the servers according to a determined procedure. The individual shares are meaningless data and it is not possible to restore the original data by only one share and information does not leak and, when a given number of shares gather, it is possible to restore the original data.

An example in which, as illustrated in FIG. 1, the processing system 100 consists of a registrar device 10 of a data registrar A, servers 20A, 20B and 20C in a data center (DC), and a user device 30 of a data user B who makes a computation request will be described below. Note that the configuration illustrated in FIG. 1 is an example only and a specific configuration and the number of sets of each device are not particularly limited. In order to simplify the description, the registrar device 10 and the user device 30 are described separately; however, in practical operation, the user device 30 may have the function that the registrar device 10 has.

First of all, a data storage process will be described. The registrar device 10 uploads registration data (for example, a table Ta) to the servers 20A to 20C of the DC and registers the registration data ((1) in FIG. 2). For example, the registration data is medical diagnosis treatment data, daily vital data, etc. The registrar device 10 segments original data Da to be uploaded into shares Sa1 to Sa3 ((1) in FIG. 3). The registrar device 10 distributes the segmented shares Sa1 to Sa3 to the servers to 20C of the DC and causes the servers 20A to 20C to store the shares Sa1 to Sa3 ((1) in FIG. 3).

For example, as illustrated in FIG. 3, the server stores the share Sa1, the server 20B stores the share Sa2, and the server 20C stores the shares Sa3 and Sb3. The single one of the servers 20A to 20C is unable to restore the shares Sa1 to Sa3 into the original data. Thus, information does not leak from the individual shares Sa1 to Sa3.

Accordingly, the original data Da is coded and cannot be referred to. In other words, even if an attacker acquires part of the segmented shares fraudulently, the attacker is unable to restore the original data. Even a system manager other than the data registrar who possesses the original data by himself/herself is unable to refer to the original data from the servers 20A to 20C of the DC. As described above, the processing system 100 enables distribution and storage of data in a safe environment, that is, enables secret sharing ((2) in FIG. 3).

The servers 20A to 20C perform anonymization on the shares Sa1 to Sa3 that the servers 20A to 20C manage, respectively ((2) in FIGS. 2 and (2) in FIG. 3). The servers 20A to 20C perform anonymization on the shares by performing multi-party computation in which computation and exchange of data are performed between the servers 20A to 20C. In multi-party computation, a plurality of servers cooperatively perform computation. In multi-party computation, data is kept dealt with in the state of shares in secret sharing. The servers 20A to 20C provide anonymization-processed information (for example, anonymization-processed table Ta') on which anonymization has been performed in a state of shares to, for example, the tenant B ((3) in FIG. 2).

A request for computation on the data that the servers 20A to 20C of the DC store is made from the user device 30 that the data user B uses ((4) in FIG. 2). The user device 30 sets a process procedure of a computation process corresponding to the request and transmits the set process procedure to each of the servers 20A to 20C.

Then, using the anonymization-processed table Ta' that is converted in anonymization, the servers 20A to 20C perform the requested computation process according to the process procedure that is set by the user device 30. The servers 20A to 20C perform a computation (secure computing) by performing a multi-party computation in which the data is dealt with in the state of shares without being restored ((5) in FIG. 2).

On ending the secure computing, each of the servers 20A to 20C transmits a computation result being kept coded to the user device 30 ((6) in FIG. 2). By restoring each of the received computation results, the user device 30 is able to acquire only the result of the requested computation. The computation result is a result obtained by computation based on the anonymized information by which no individual is identified. Consequently, in secure computing, even when a cross-sectional analysis by a third party is made, anonymization makes it possible to obtain a result in a form by which no individual is identified and it is unnecessary to gain consent for provision to a third party.

Registrar Server

Figure 4:
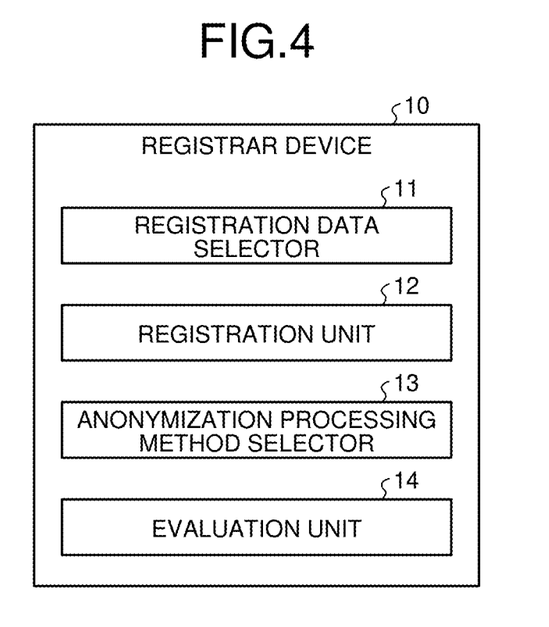
FIG. 4 is a diagram schematically illustrating an example of a configuration of a registrar device.
Figure 5:
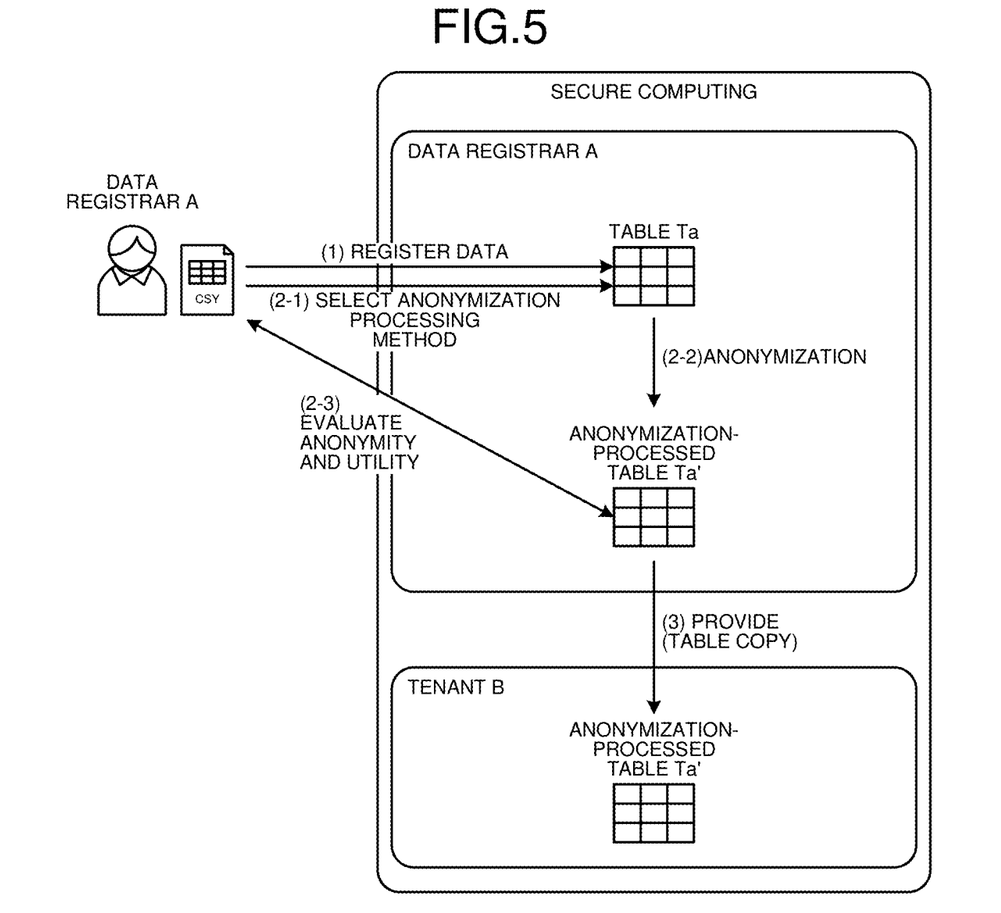
FIG. 5 is a diagram illustrating an overview of a process by the processing system according to the embodiment.

Subsequently, a configuration of each device of the processing system 100 will be described. First of all, a configuration of the registrar device 10 will be described. FIG. 4 is a diagram schematically illustrating an example of the configuration of the registrar device 10. FIG. 5 is a diagram illustrating an overview of a process by the processing system according to the embodiment. With reference to FIG. 4 and FIG. 5, the configuration of the registrar device 10 will be described.

The registrar device 10 is realized in a way that a given program is read by a computer, or the like, that includes a ROM (Read Only Memory), a RAM (Random Access Memory), and a CPU (Central Processing Unit) and the CPU executes the given program. The registrar device 10 includes a communication interface that transmits and receives various types of information to and from another device that is connected via a network, or the like. For example, the registrar device 10 includes a NIC (Network Interface Card), or the like, and performs telecommunication with another device via a telecommunication line, such as a LAN (Local Area Network) or the Internet. The registrar device 10 includes an input device, such as a touch panel, an audio input device, or a keyboard and a mouse, and a display device, such as a liquid crystal display, and inputs and outputs information. The registrar device 10 includes a registration data selector 11, a registration unit 12, an anonymization processing method selector 13 (selector), and an evaluation unit 14.

The registration data selector 11 selects data to be stored in the servers 20A to 20C by secret sharing from the data that is registered in the DB (Database) of the data registrar A according to operations by a person who operates the registrar device 10.

The registration unit 12 divides the data that is selected by the registration data selector 11 into a plurality of shares and distributes the divided shares to the servers 20A to 20C, respectively, and causes the servers 20A to 20C to store the shares ((1) in FIG. 5). For example, the person who operates the registrar device 1 selects registration data and makes a request to distribute and store shares via a WebUI screen for the processing system 100 that is loaded by a Web browser.

According to operations by the data registrar A, the anonymization processing method selector 13 selects an anonymization processing method for the data that is registered in the servers 20A to 20C (the table Ta in FIG. 5) and makes a request for anonymization by the selected anonymization processing method ((2-1) in FIG. 5). The anonymization processing method includes, for example, item deletion/record deletion/cell deletion/generalization, micro-aggregation, data exchange (swap), noise (error) addition, and pseudo data generation. After the shares are distributed to and stored in the servers 20A to 20C, respectively, by the registration unit 12, the anonymization processing method selector 13 selects an anonymization processing method. The anonymization processing method selector 13 may automatically select an anonymization processing method according to a rule that is defined previously.

The evaluation unit 14 performs evaluation on the anonymization-processed information in anonymity and utility (for example, the anonymization-processed table Ta') on which anonymization has been performed by the servers 20A to 20C ((2-3) in FIG. 5) and, when the anonymization-processed information has anonymity and utility, notifies the servers 20A to 20C of permission to provide the anonymization-processed information. Anonymity, for example, is determined based on whether the anonymization-processed information meets k-anonymity. A value of k is set according to the type and the description of the original data. Utility, for example, is determined based on matching of strings between the original data and the anonymization-processed information and deviance from the original data in the average or the variance of description of the anonymization-processed information.

The evaluation unit 14 presents the anonymization-processed table Ta' on which anonymization has been performed by the servers 20A to 20C to the data registrar A and, according to operations by the data registrar A, receives the result of the evaluation on the anonymization-processed table Ta' in anonymity and utility. On receiving the evaluation result presenting that the anonymization-processed table Ta' has anonymity and utility, the evaluation unit 14 notifies the servers 20A to 20C of permission to provide the anonymization-processed table Ta'. On receiving the evaluation result presenting that the anonymization-processed table Ta' does not have anonymity and utility, the evaluation unit 14 notifies the servers 20A to 20C of disposal of the anonymization-processed table Ta' and the process repeats from selection of an anonymization processing method by the anonymization processing method selector 13.

The evaluation unit 14 may automatically determine anonymity and utility according to a rule that is defined previously. For example, a k-value of k-anonymity and a threshold of deviance for utility determination are set previously according to the type of the original data, etc. The evaluation unit 14 then calculates k-anonymity of the anonymization-processed information according to the setting and, when the k-anonymity is met, determines that the anonymization-processed information has anonymity. Subsequently, the evaluation unit 14 calculates deviance of the average of description of the anonymization-processed information from the original data and, when the deviance is at or under the threshold, determines that the anonymization-processed information has utility.

Server

Figure 6:
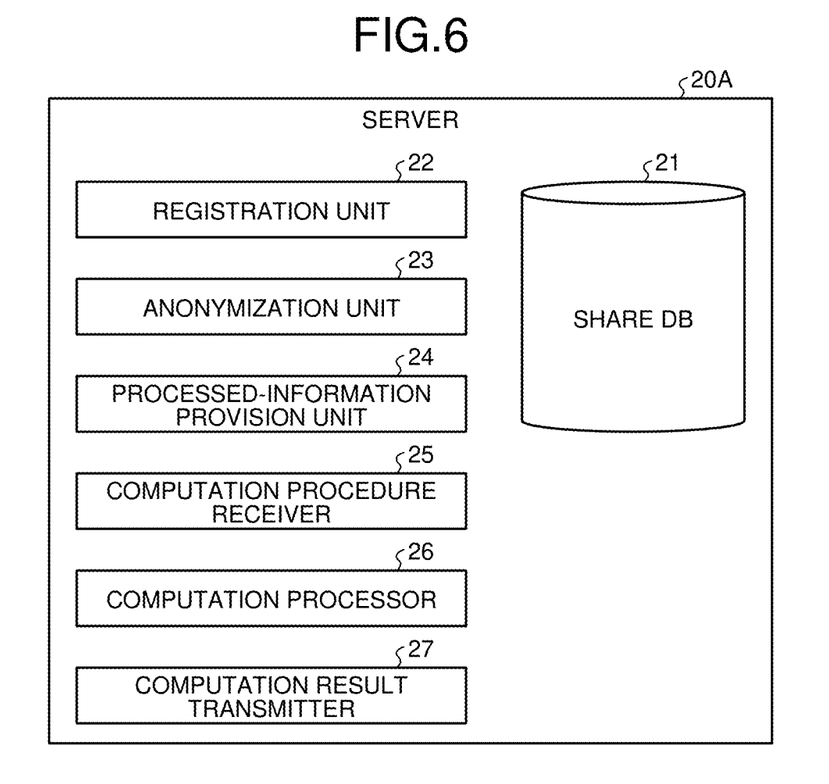
FIG. 6 is a diagram schematically illustrating an example of a configuration of a server.

A configuration of the server 20A will be described. FIG. 6 is a diagram schematically illustrating an example of the configuration of the server 20A. The servers 20A and 20B have the same function as that of the server 20A.

The server 20A is realized in a way that a given program is read by a computer, or the like, that includes a ROM, a RAM, and a CPU and the CPU executes the given program. The server 20A includes a communication interface that transmits and receives various types of information to and from another device that is connected via a network, or the like. For example, the server 20A includes a NIC, or the like, and performs communication with another device via a telecommunication line, such as a LAN or the Internet. The server 20A includes an input device, such as a touch panel, an audio input device, or a keyboard and a mouse, and a display device, such as a liquid crystal display, and inputs and outputs information. The server 20A includes a share DB 21, a registration unit 22, an anonymization unit 23, a processed-information provision unit 24 (provider), a computation procedure receiver 25, a computation processor 26, and a computation result transmitter 27.

The share DB 21 stores a share that is requested to register by the registrar device 10.

The registration unit 22 receives a registration request from the registrar device 10 and stores a share that is requested to register by the registrar device 10 in the share DB 21.

The anonymization unit 23 performs anonymization on the share in secure computing. The anonymization unit 23 performs anonymization on the share using the anonymization processing method that is selected by the anonymization processing method selector 13 of the registrar device 10. The anonymization unit 23 performs anonymization on the share by performing multi-party computation in which computation and exchange of data are performed between the servers 20A to 20C. As described above, by performing multi-party computation, the anonymization unit 23 performs anonymization without restoring data (for example, the table Ta in FIG. 5), thereby generating anonymization-processed information (the anonymization-processed table Ta' in FIG. 5) ((2-2) in FIG. 5). The anonymization unit 23 transmits the anonymization-processed information to the registrar device 10.

The processed-information provision unit 24 provides, to the user device 30, the anonymization-processed information about which a notification of provision of anonymization-processed information is made by the evaluation unit 14 of the registrar device 10. For example, as illustrated in FIG. 5, the processed-information provision unit 24 makes a table copy of the anonymization-processed table Ta' to a tenant B area in secure computing that is usable by the data user B ((3) in FIG. 5), so that the user device 30 is able to use the anonymization-processed table Ta'. The tenant B area may be an open tenant area that are usable by users other than the data user B.

The computation procedure receiver 25 receives the process procedure of the computation process that is set by the user device 30.

Using the anonymization-processed information, the computation processor 26 performs the requested computation process according to the process procedure that is set by the user device 30. The computation processor 26 performs secret computing by performing multi-party computation in which computation and exchange of statistical information in a state of shares are performed. A computation result transmitter 27 transmits the result of the computation to the user device 30.

User Device

Figure 7:
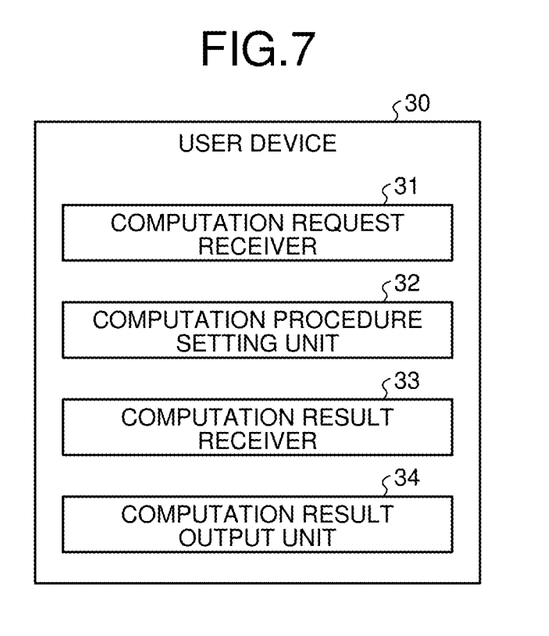
FIG. 7 is a diagram schematically illustrating an example of a configuration of a user device.

A configuration of the user device 30 will be described next. FIG. 7 is a diagram schematically illustrating an example of the configuration of the user device 30.

The user device 30 is realized in a way that a given program is read by a computer, or the like, that includes a ROM, a RAM, and a CPU and the CPU executes the given program. The user device 30 includes a communication interface that transmits and receives various types of information to and from another device that is connected via a network, or the like. For example, the user device 30 includes a NIC, or the like, and performs communication with another device via a telecommunication line, such as a LAN or the Internet. The user device 30 includes an input device, such as a touch panel, an audio input device, or a keyboard and a mouse, and a display device, such as a liquid crystal display, and inputs and outputs information. The user device 30 includes a computation request receiver 31, a computation procedure setting unit 32, a computation result receiver 33, and a computation result output unit 34.

The computation request receiver 31 receives a computation request on the data that the servers 20A to 20C store according to operations by the person (requester) who operates the user device 30.

The computation procedure setting unit 32 sets a process procedure of a computation process corresponding to the request and transmits the computation request together with the set process procedure to each of the servers 20A to 20C.

The computation result receiver 33 receives a calculation result being kept coded from each of the servers 20A to 20C.

The computation result output unit 34 restores each of the received computation results and acquires only the requested computation results. The computation result output unit 34 then outputs the computation results. For example, the person who operates the user device 30 inputs a computation request and specifies a form of display (table, graph, or the like) of a computation process result via a WebUI screen for the processing system 100 that is loaded by a Web browser.

Process Procedure

Figure 8:
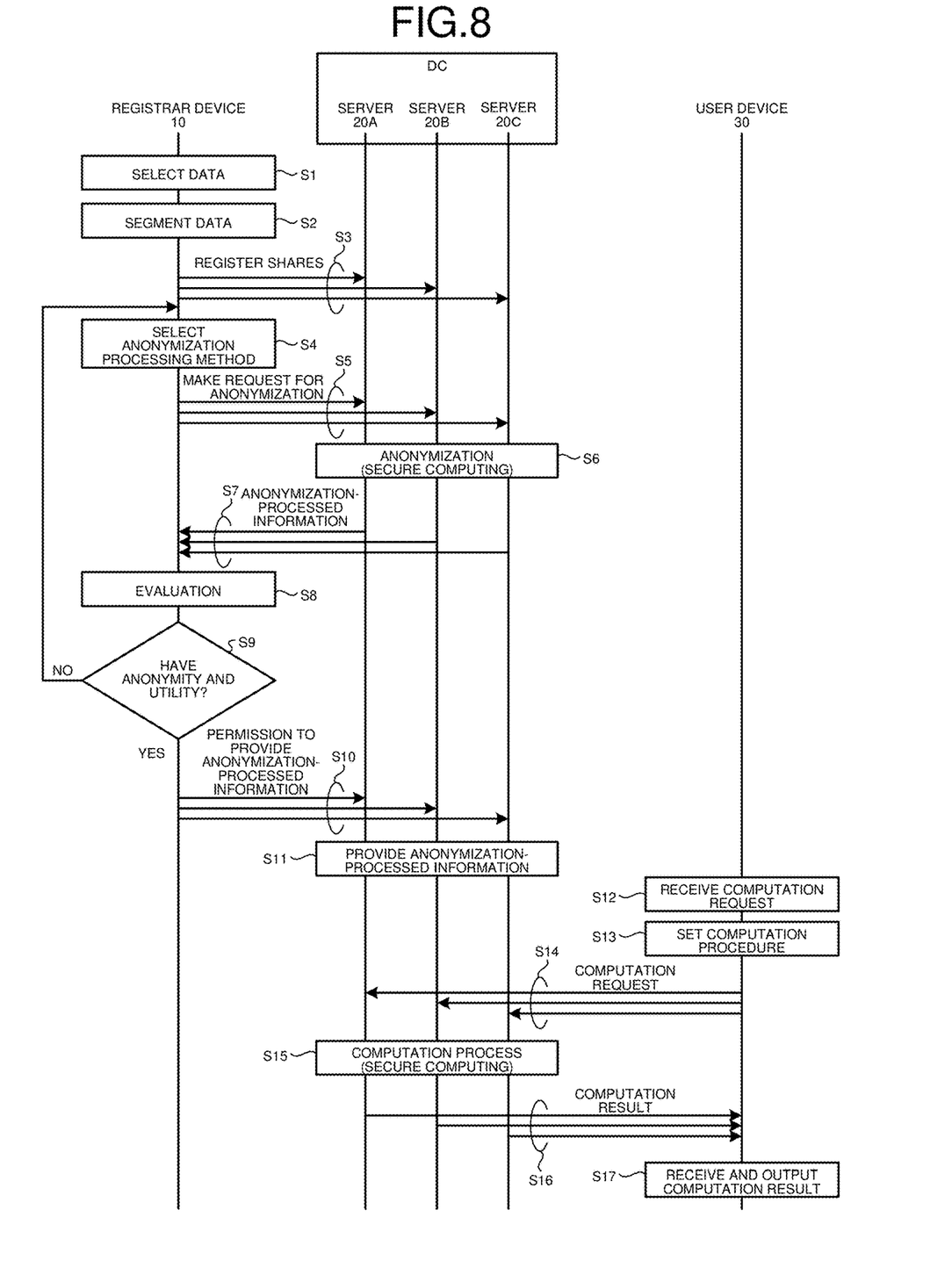
FIG. 8 is a sequence chart illustrating a process procedure of secure computing that the processing system executes.

A process procedure of secure computing in the processing system 100 will be described next. FIG. 8 is a sequence chart illustrating the process procedure of secure computing that the processing system 100 executes.

As illustrated in FIG. 8, the registrar device 10 selects data to be stored from data that is registered in the DB (step S1), segments the selected data into a plurality of shares (step S2), and makes a share registration request to distribute the shares to the servers 20A to 20C, respectively, and cause the servers 20A to 20C to register the shares (step S3).

The registrar device 10 selects an anonymization processing method for the data that is registered in the servers 20A to 20C (step S4) and makes a request for anonymization by the selected anonymization processing method (step S5).

The servers 20A to 20C perform anonymization on the shares using the anonymization processing method that is selected by the registrar device 10 in secure computing (step S6). The servers 20A to 20C transmit anonymization-processed information to the registrar device 10 (step S7).

The registrar device 10 performs evaluation in anonymity and utility on the anonymization-processed information on which anonymization has been performed by the servers 20A to 20C (step S8). When the anonymization-processed information does not have anonymity and utility (step S9: NO), the registrar device 10 notifies the servers to 20C of disposal of the anonymization-processed information and repeats the process from selection of an anonymization processing method at step S4. When the anonymization-processed information has anonymity and utility (step S9: YES), the registrar device 10 notifies the servers 20A to 20C of permission to provide the anonymization-processed information (step S10).

On receiving the permission to provide the anonymization-processed information from the registrar device 10, the servers 20A to 20C provide the anonymization-processed information on which permission to provide anonymization-processed information is made such that other users can share the anonymization-processed information (step S11).

On receiving a computation request (step S12), the user device 30 sets a process procedure of a computation process corresponding to the request (step S13) and transmits the computation request together with the set process procedure to each of the servers 20A to 20C (step S14).

Using the anonymization-processed information, the servers 20A to 20C perform the computation process according to the process procedure that is set by the user device 30 (step S15). Step S15 is secure computing using multi-party computation.

Each of the servers 20A to 20C transmits the computation result to the user device 30 (step S16). The user device 30 receives the computation result being kept coded from each of the servers 20A to 20C and, after restoring the results, outputs the calculation results (step S17).

Effects of Embodiment

As described above, in the embodiment, in secure computing in which computation can be performed with data being kept coded, by performing anonymization on original data in secure computing, anonymization-processed information by which no individual is specified is provided to a third party. Thus, in the embodiment, even when a third party makes a cross-sectional analysis using data in secure computing, each of the servers 20A to 20C performs a computation process in secure computing using anonymization-processed information by which no individual is specified and therefore it is possible to return a calculation result in a form by which no individual is specified.

Thus, according to the embodiment, it is unnecessary to gain consent for provision of personal information to a third party when data in secure computing is used. In the embodiment, the data registrar A is able to select an anonymization processing method for registration data and, after anonymity and utility of anonymization-processed information are evaluated, the anonymization-processed information is provided to a third party and therefore it is possible to provide data that ensures both anonymity and utility.

Modification

Figure 9:
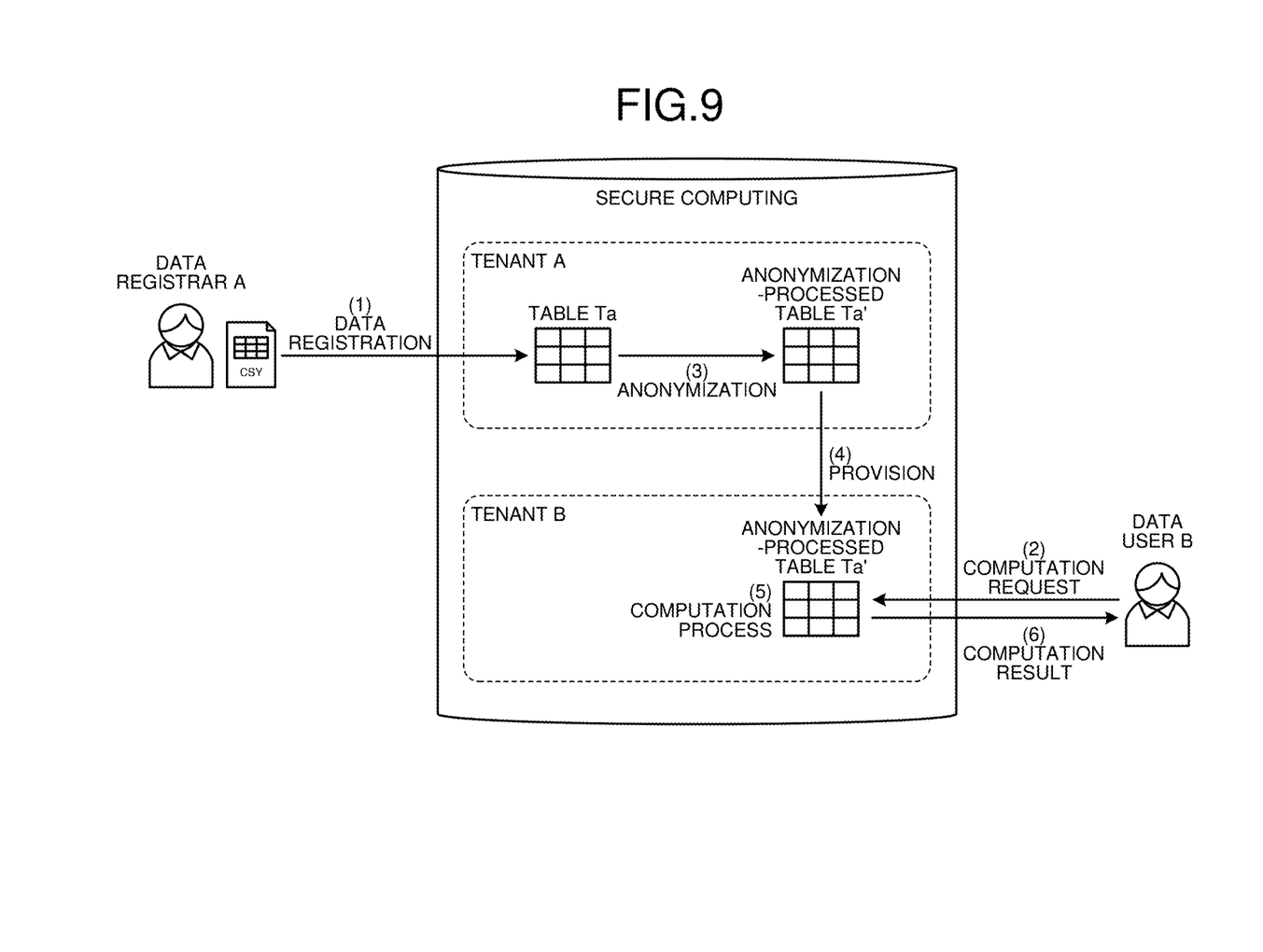
FIG. 9 is a diagram illustrating another example of the overview of the process by the processing system according to the embodiment.

A modification of the embodiment will be described next. FIG. 9 is a diagram illustrating another example of the overview of the process by the processing system according to the embodiment.

As illustrated in FIG. 9, after shares are distributed to the servers 20A to 20C, respectively, and are registered in the servers 20A to 20C by the registration unit 12 ((1) in FIG. 9), and when a computation process is requested by the user device 30 ((2) in FIG. 9), an anonymization processing method selector 13 may select an anonymization processing method corresponding to the requested computation process on the side of the registrar device 10. The servers 20A to 20C execute anonymization in secure computing using the anonymization processing method along a computation policy of the data user B that is selected by the registrar device 10 ((3) in FIG. 9).

Accordingly, the anonymization-processed table Ta' on which anonymization has been performed by a method along the computation policy of the data user B is provided to the tenant B ((4) in FIG. 9) and the servers 20A to 20C perform the computation process using the anonymization-processed information that has been processed ((5) in FIG. 9). As a result, the computation result that is returned to the data user B ((6) in FIG. 9) is along the computation policy of the data user B and thus smooth analysis is enabled.

Process Procedure

Figure 10:
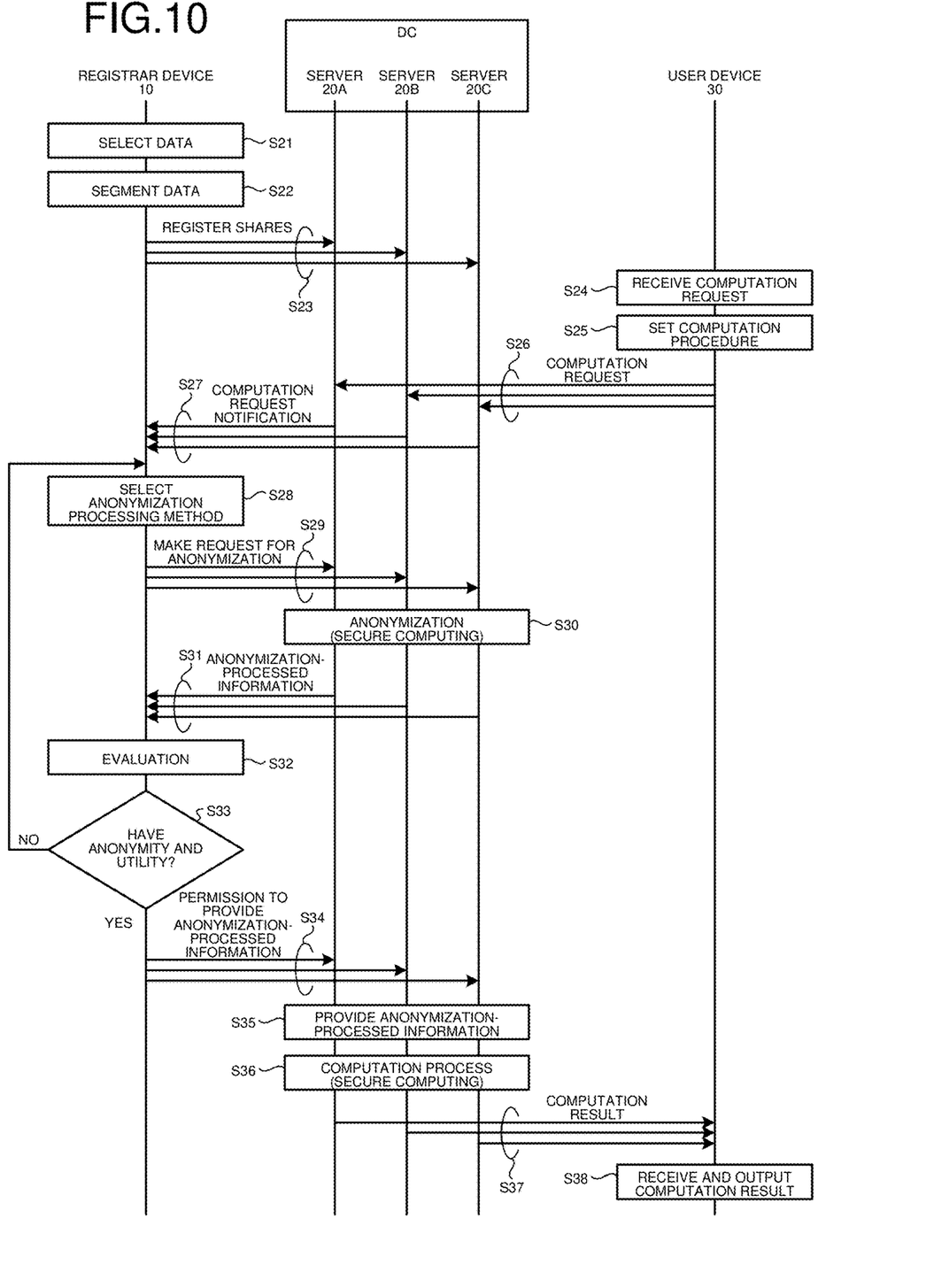
FIG. 10 is a sequence chart illustrating another process procedure of secure computing that the processing system executes.

Another process procedure of secure computing in the processing system 100 will be described next. FIG. 10 is a sequence chart illustrating another process procedure of secure computing that the processing system 100 executes.

Steps S21 to S23 are the same process as that of steps S1 to S3 illustrated in FIG. 8. On receiving a computation request (step S24), the user device 30 sets a process procedure of a computation process corresponding to the request (step S25) and transmits the computation request together with the set process procedure to each of the servers 20A to 20C (step S26). The servers 20A to 20C transmit a computation request notification that notifies a policy of the requested computation to the registrar device 10 (step S27).

The registrar device 10 selects an anonymization processing method along the computation policy of the data user B (step S28) and makes a request for anonymization by the selected anonymization processing method (step S29). The servers 20A to 20C execute anonymization in secure computing using the anonymization processing method that is selected by the registrar device (step S30). Steps S31 to S35 in FIG. 10 are the same process as that of steps S7 to S11 in FIG. 8.

The servers 20A to 20C perform a computation process in secure computing using anonymization-processed information on which anonymization has been performed by the method along the computation policy of the data user B (step S36). Steps S37 and S38 in FIG. 10 are the same process as that of steps S16 and S17 in FIG. 8.

As described above, selecting an anonymization processing method along the computation policy of the data user B on the side of the data registrar A enables smooth analysis by the data user B.

System Configuration, Etc.

Each component of each device illustrated in the drawings is a functional idea and need not necessarily be configured physically as illustrated in the drawings. In other words, specific modes of distribution and integration of devices are not limited to those illustrated in the drawings and all or part of the devices can be configured by functional or physical distribution or integration in any unit according to various types of load and usage. Furthermore, all or given part of each processing function implemented by each device can be realized by a CPU or a GPU (Graphics Processing Unit) and a program that is analyzed and executed by the CPU or the GPU or can be realized as hardware according to wired logic.

Among the processes described in the above-described embodiment, all or part of the process that is described as one performed automatically can be performed manually or all or part of the process that is described as one performed manually can be performed automatically by a known method. In addition to this, the process procedure, the control procedure, the specific names, and the information including various types of data and parameters that are presented in the description above and the drawings are changeable freely unless otherwise noted.

Program

It is possible to create a program in which the processes that the registrar device 10, the servers 20A to 20C, and the user device 30 described in the above-described embodiment execute are written in a computer-executable language. For example, it is also possible to create a program in which the processes that the registrar device 10, the servers 20A to 20C, and the user device 30 in the embodiment execute in a computer executable language. In this case, execution of the program by a computer makes it possible to obtain the same effect as that of the above-described embodiment. Furthermore, the program may be recorded in a computer-readable recording medium and a computer may be caused to read and execute the program that is recorded in the recording medium, thereby realizing the same processes as those of the above-described embodiment.

Figure 11:
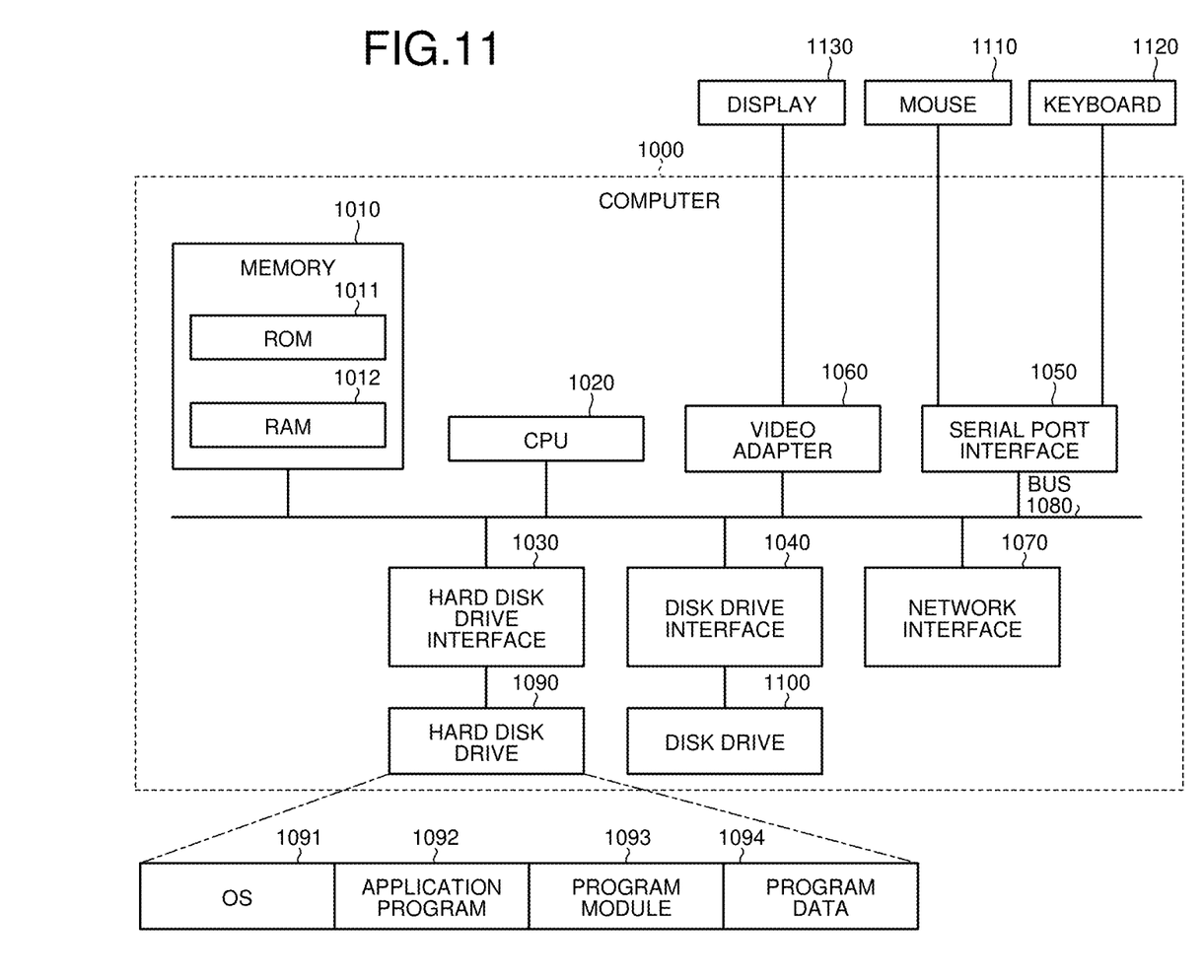
FIG. 11 is a diagram illustrating a computer that executes a program.

FIG. 11 is a diagram illustrating a computer that executes a program. As exemplified in FIG. 11, a computer 1000 includes, for example, a memory 1010, a CPU 1020, a hard disk drive interface 1030, a disk drive interface 1040, a serial port interface 1050, a video adapter 1060, and a network interface 1070. Each of these units is connected via a bus 1080.

As exemplified in FIG. 11, the memory 1010 includes a ROM (Read Only Memory) 1011 and a RAM 1012. The ROM 1011 stores, for example, a boot program, such as a BIOS (Basic Input Output System). As exemplified in FIG. 11, the hard disk drive interface 1030 is connected to a hard disk drive 1090. The disk drive interface 1040 is connected to a disk drive 1100. For example, a detachable recording medium, such as, for example, a magnetic disk or an optical disk, is inserted into the disk drive 1100. The serial port interface 1050 is connected to, for example, a mouse 1110 and a keyboard 1120. For example, the video adapter 1060 is connected to, for example, a display 1130.

As exemplified in FIG. 11, the hard disk drive 1090 stores, for example, an OS (Operating System) 1091, an application program 1092, a program module 1093, and program data 1094. In other words, the above-described program is stored in, for example, the hard disk drive 1090 as a program module in which instructions to be executed by the computer 1000 are written.

The various types of data described in the above-described embodiment are stored in, for example, the memory 1010 and the hard disk drive 1090 as program data. The CPU 1020 reads the program module 1093 and the program data 1094 that are stored in the memory 1010 and the hard disk drive 1090 to the RAM 1012 as requested and executes various types of process procedure.

Note that the program module 1093 and the program data 1094 according to the program are not limited to being stored in the hard disk drive 1090, and the program module 1093 and the program data 1094 may be stored in, for example, a detachable storage medium and may be read by the CPU 1020 via the disk drive, or the like. Alternatively, the program module 1093 and the program data 1094 according to the program may be stored in another computer that is connected via a network (such as a LAN (Local Area Network) or a WAN (Wide Area Network)) and may be read by the CPU 1020 via the network interface 1070.

The above-described embodiment and modifications of the embodiment are included in the invention described in CLAIMS and equivalents of the invention as the present application is included in the technique disclosed by the present application.

According to the present invention, it is possible to enable nonnecessity for gaining consent for provision of personal information to a third party when data in secure computing is used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A processing system that distributes registration data that a registrar device has to a plurality of servers in a state of being segmented shares, and stores the registration data in the servers, each of the servers comprising:
first processing circuitry configured to:
perform anonymization on the shares; and
provide anonymization-processed information on which anonymization is performed in the state of being shares, wherein the registrar device includes:
second processing circuitry configured to:
segment the registration data into a plurality of shares, distribute the plurality of shares to the servers, respectively, and cause the servers to register the plurality of shares,
select an anonymization processing method, and
perform evaluation in anonymity and utility on the anonymization-processed information on which anonymization is performed and, when the anonymization-processed information has the anonymity and the utility, notify the servers of a permission to provide the anonymization-processed information, and the first processing circuitry is further configured to:
perform anonymization on the plurality of shares using the anonymization processing method that is selected, and
provide the anonymization-processed information about which a notification of the permission to provide the anonymization-processed information is made.

2. The processing system according to claim 1, wherein; the first processing circuitry is further configured to perform anonymization on the shares by performing multi-party computation in which computation and exchange of data are performed between the servers.

3. The processing system according to claim 1, wherein: after the plurality of shares are distributed to the servers, respectively, and are registered in the servers, the second processing circuitry is further configured to select the anonymization processing method.

4. The processing system according to claim 1, wherein: after the plurality of shares are distributed to the servers, respectively, and are registered in the servers, and when a computation process is requested by a user device, the second processing circuitry is further configured to select an anonymization processing method corresponding to the requested computation process.

5. A processing method that is executed by a processing system that distributes registration data that a registrar device has to a plurality of servers in a state of being segmented shares, and stores the registration data in the servers, the processing method comprising:
performing anonymization on the shares;
providing anonymization-processed information on which anonymization is performed in the state of being shares;
segmenting the registration data into a plurality of shares, distributing the plurality of shares to the servers, respectively, and causing the servers to register the plurality of shares,
selecting an anonymization processing method,
performing evaluation in anonymity and utility on the anonymization-processed information on which anonymization is performed and, when the anonymization-processed information has the anonymity and the utility, notify the servers of a permission to provide the anonymization-processed information,
performing anonymization on the plurality of shares using the anonymization processing method that is selected, and
providing the anonymization-processed information about which a notification of the permission to provide the anonymization-processed information is made.

6. A non-transitory computer-readable recording medium storing therein a processing program that causes a computer to execute a process comprising:
storing registration data in a distributed manner in a state of being shares obtained by segmenting registration data;
performing anonymization on the shares;
providing anonymization-processed information on which the anonymization is performed in the state of being shares;
segmenting the registration data into a plurality of shares, distributing the plurality of shares to a plurality of servers, respectively, and causing the servers to register the plurality of shares,
selecting an anonymization processing method,
performing evaluation in anonymity and utility on the anonymization-processed information on which anonymization is performed and, when the anonymization-processed information has the anonymity and the utility, notify the servers of a permission to provide the anonymization-processed information,
performing anonymization on the plurality of shares using the anonymization processing method that is selected, and providing the anonymization-processed information about which a notification of the permission to provide the anonymization-processed information is made.

* * * * *